United States Patent
Baillot

(10) Patent No.: US 7,538,724 B1
(45) Date of Patent: May 26, 2009

(54) METHOD AND SYSTEM FOR RELATIVE TRACKING

(75) Inventor: Yohan Baillot, Reston, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 47 days.

(21) Appl. No.: 11/763,763

(22) Filed: Jun. 15, 2007

(51) Int. Cl.
*G01S 1/02* (2006.01)
*G01S 5/14* (2006.01)
*G01C 21/00* (2006.01)

(52) U.S. Cl. .......................... 342/357.08; 342/357.06; 342/357.07; 342/457; 701/213

(58) Field of Classification Search ................................ 342/357.06–357.08, 450–451, 457; 701/207, 701/213; 455/456.1, 456.3, 456.6
See application file for complete search history.

(56) References Cited

U.S. PATENT DOCUMENTS

| | | | |
|---|---|---|---|
| 6,014,080 A * | 1/2000 | Layson, Jr. ............... | 340/573.1 |
| 6,166,744 A | 12/2000 | Jaszlics et al. | |
| 6,169,497 B1 | 1/2001 | Robert | |
| 6,442,476 B1 | 8/2002 | Poropat | |
| 7,218,227 B2 * | 5/2007 | Davis et al. ............... | 340/572.1 |
| 2007/0229350 A1 * | 10/2007 | Scalisi et al. ................. | 342/350 |
| 2007/0243855 A1 * | 10/2007 | Hoffman et al. ......... | 455/404.2 |
| 2007/0273610 A1 | 11/2007 | Baillot | |

* cited by examiner

*Primary Examiner*—Dao L Phan
(74) *Attorney, Agent, or Firm*—Edell, Shapiro & Finnan, LLC

(57) ABSTRACT

Systems and methods for providing relative tracking for a user in an unprepared environment, e.g., in the field. A larger mobile unit, such as a truck, is tracked precisely in world coordinates using GPS and/or other tracking technology. A smaller mobile object or unit is then tracked with respect to the larger mobile unit. The tracking information of the smaller mobile object or unit is then combined with the tracking of the larger mobile unit such that the tracking of the smaller mobile object or unit can be provided in world coordinates. The relative tracking methodology has particular utility in the field of augmented reality where precise tracking in an unprepared environment may be desirable, but where a smaller mobile object may not be able to be tracked directly and precisely in world coordinates.

32 Claims, 3 Drawing Sheets

METHOD AND SYSTEM FOR RELATIVE TRACKING

FIELD OF THE INVENTION

The present invention relates to the tracking of a person or object where it may not be possible or practical for the person or object to carry systems for precise self-tracking.

BACKGROUND OF THE INVENTION

Tracking is the measurement by one or a group of sensors of the position and, often also, the orientation, of a person or object in a given space.

Tracking is an important aspect of, for example, the general field of Augmented Reality ("AR") in which computer generated data and/or imagery is combined with a real world view of a given scene. An AR application might, for example, simulate a training session for firefighters wherein a firefighter trainee might "spray" extinguishing agent toward "fire particles." The trainee may wear a helmet along with a head-mounted display through which the trainee can view the real world scene. A computer, in communication with the head-mounted display, generates images (including the "spray" and "fire particles") that are superimposed on the real world scene and that are in proper registration with the real world scene regardless of how the firefighter trainee moves his head. Thus, for example, when the firefighter trainee looks down towards the ground, the computer may generate appropriate images of flames that are then superimposed on the real world scene or view, and when the firefighter looks up, the computer may generate images of billowing smoke and superimpose the same on the real world scene or view. In this way, a complete training session may be implemented without ever having to burn any structures, consume flammable substances, or unnecessarily place personnel (especially untrained personnel) in danger.

Those skilled in the art appreciate that to provide to the user the appropriate imagery at the appropriate time and to make a firefighting training exercise like that described above useful, it is necessary to closely and continuously track the position and orientation of the user's head (sometimes referred to as "pose"), and thus line of sight, to generate and display the appropriate images to the user. Consequently, precise tracking is of critical importance in the implementation of augmented reality systems. Indeed, if the tracking technology used for a given application cannot generate sufficiently precise tracking information or data, then the resulting computer generated imagery might actually be more of a hindrance or distraction than a help to the user in that such imagery may be improperly registered with the real world view or scene.

Precise tracking becomes even more important as the granularity of what a user expects to see increases. For example, AR is sometimes employed for other forms of training exercises in which, for example, outlines of selected parts of an intricate mechanical device (e.g., an engine) within the view of the user are superimposed on the real world view of the device. Thus, even the slightest change in the orientation of the user's head will substantially change the view and, as a consequence, the computer generated imagery to be combined with the real world view. There is, accordingly, a need to provide improved tracking systems and methodologies generally, and which may also have particular utility in the context of augmented reality systems.

SUMMARY OF THE INVENTION

Embodiments of the present invention provide systems and methods via which a person or object may be tracked in, e.g., an unprepared environment, by leveraging the tracking capabilities of a relatively large mobile unit that can carry relatively more sophisticated, more precise, and/or heavier tracking equipment, as compared to what can be carried by a relatively smaller mobile unit, such as a person or small object.

In accordance with one possible implementation, a method is provided in which a position and orientation of a first mobile unit with respect to a world coordinate system is established. As used herein, "world coordinates" or a "world coordinate system" means a one or a set of 3D position coordinates expressed with respect to a referential/origin attached to the Earth. One example is a geodetic coordinate which a spherical coordinate expressed as two angles (latitude/longitude) and height (altitude) with respect to the center of the earth. Preferably, the first mobile unit is equipped with a first tracking system that is operable to produce tracking information in the world coordinate system. A position of a second mobile unit is tracked with respect to the first mobile unit using a second tracking system that is mounted on or near the first mobile unit, and tracking information is produced that is in a coordinate system relative to the first mobile unit. In a preferred aspect of the invention, the second mobile unit is operated outside of any structural confines of the first mobile unit. In this way, the second mobile unit, which may include a person, is free to work outside of a pre-configured environment.

To obtain a position and orientation (i.e., tracking or pose information or data) for the second mobile unit in the world coordinate system, the tracking information of the first mobile unit in the world coordinate system is combined with the tracking information of the second mobile unit in the coordinate system relative to the first mobile unit. The resulting position and orientation of the second mobile unit in the world coordinate system may then be used in connection with, e.g., an Augmented Reality system in which more precise tracking information may be desired. For instance, in accordance with an embodiment of the invention, less than one degree in orientation and less than 0.1 meter in position is achievable when the tracking information of the second mobile unit is combined with the more precise tracking information available for the first mobile unit, where the first mobile unit may be a truck or other large structure that can be precisely tracked using e.g., the global positioning system (GPS).

Because the present invention has applicability to Augmented Reality systems, the second mobile unit may include a head-mounted display.

An optical short range tracker that is mounted on or near the first mobile unit may be configured to follow (manually or automatically) the second mobile unit to track the second mobile unit with respect to the first mobile unit.

These and other features of the several embodiments of the invention along with their attendant advantages will be more fully appreciated upon a reading of the following detailed description in conjunction with the associated drawings.

DETAILED DESCRIPTION

Figure 1:
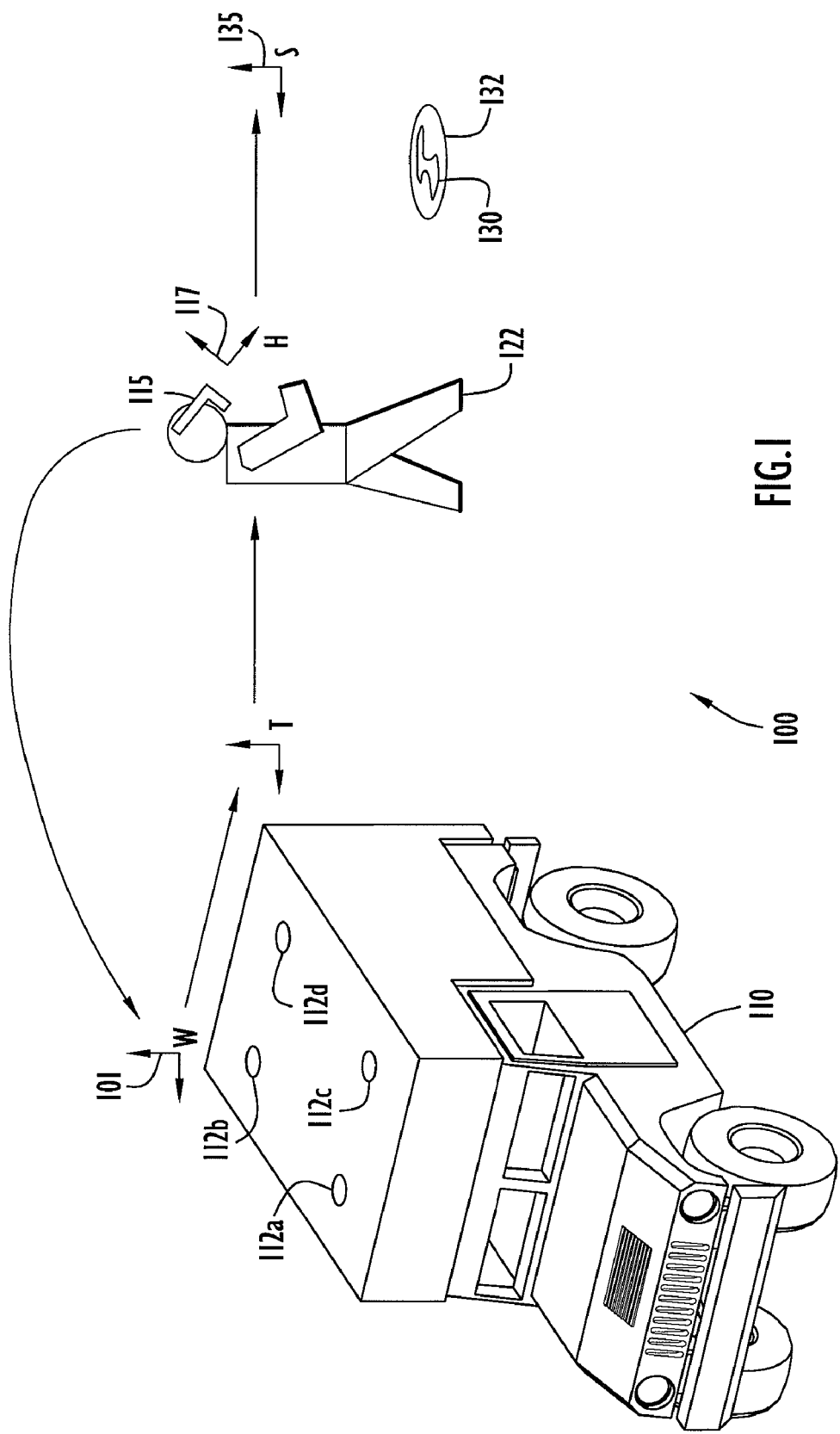
FIG. 1 is a diagram depicting the relationship among several system elements and related coordinate systems in accordance with an embodiment of the invention.

Embodiments of the invention employ the relatively precise and long range tracking capabilities of tracking systems that are more suitably mounted on a large mobile structure (such as a car, truck, jeep, mobile rig, ship, helicopter, unmanned aerial vehicle (UAV), balloon, and the like) to provide precise tracking of the large mobile structure in an unprepared environment, i.e., in the field. A user, who may be inside the large mobile structure, or dismounted from the large mobile structure and therefore outside the confines of the large mobile unit, but who is still operating relatively close to the large mobile structure, may then be tracked with respect to the large mobile structure such that the user's position, and preferably also orientation (collectively "pose'), can be tracked with substantially the same precision as the large mobile structure without the user having to carry the larger, heavier and more precise tracking systems. The term "user" is used herein to denote a person. The user may wear or carry a device, such as a helmet and/or head-mounted display, which may be the true focus of any tracking in accordance with the present invention.

Although not limited to the field of Augmented Reality, the systems and methods described herein have particular applicability to AR. Specifically, a dismounted user in the field, wearing a head-mounted display, might need precise tracking to, e.g., identify buried cables or pipelines, identify overhead wires, locate mines, or perform surveying activities, among many other possible tasks. Although embodiments of the instant invention are particularly advantageous for dismounted users, it is contemplated that the user may also be located within the vehicle and be able to view the scene from that vantage point.

As noted, embodiments of the present invention provide precise tracking to a relatively small object (e.g., a user's head/helmet, a computer tablet, a limb, a head-mounted display) at locations where such tracking precision may be unavailable or not practical. Those skilled in the art will appreciate that the definition of "precision tracking" or "precise tracking" varies according to a given application, but for many applications it can be considered, for purposes of illustration, to be less than 0.1 m in position and less than 1 degree in orientation. Likewise, a definition of a "small mobile object" or "small mobile unit" (again, e.g., a user's head, computer tablet, a limb, head-mounted display, camera, etc.) could be an object that is less than 0.3 m in all dimensions, these dimensions again being for purposes of illustration only. A small mobile object in accordance with embodiments of the present invention may also be an object that is too small to accommodate a long range, precise tracking system, which may instead be more practicably mounted on a relatively larger mobile object.

Embodiments of the instant invention address the problem of providing precise tracking for a small mobile object(s) by tracking precisely the small object(s) with respect to a large object that can be placed nearby the operating environment of the small object(s). The tracking (e.g., position and orientation) of the small object is then provided by combining the tracking of the large object with respect to the environment with the tracking of the small object with respect to the large object. In a preferred implementation, the small mobile unit or object is passive with respect to its own tracking in that it preferably does not itself generate or transmit position or orientation information to the large mobile unit. Rather, the large mobile unit actively performs tracking for its own position/orientation and, as well, for the position/orientation of the small mobile unit, as will be explained more fully later herein. In another possible implementation, the small mobile object may track the large mobile unit and feeds pose coordinates back to the large mobile unit.

As is well-known, a large mobile object (or structure) can be precisely tracked using relatively large/heavy sensors, or sensors that have improved sensitivity when disposed along or across a large baseline. However, such large, heavy sensors cannot typically or practically be attached to the small mobile object. For example, a GPS-based orientation tracker that relies on a phase difference between the signals received by several GPS antennas that are placed along a long baseline cannot practically be used on a small object (e.g., a person's head) due to the long baseline requirement.

Achieving increasingly precise tracking data often requires that the size and weight of sensors also increase. For example, a navy ship can be precisely tracked using a large and heavy inertial motion unit, but, again, such a unit cannot be practicably placed on a user's head.

It is known that a small object can be precisely tracked with respect to a large structure by preparing the large structure with a precise tracking infrastructure to track the small object. For example, an optical sensor comprising a camera or several cameras may be arranged within a room and be trained on markers placed on the small object. Such systems are sometimes referred to as "static tracking infrastructures." The disadvantage of such systems is that one can operate only within the pre-prepared environment. In other words, unlike the embodiments of the present invention, static tracking infrastructures do not offer tracking beyond the confines of the pre-configured room or space.

One variation of this type of tracking system is implemented for a pilot's helmet within a cockpit of an aircraft. In this case, the pilot's helmet is tracked in order to overlay target information on the helmet's attached heads-up-display (HUD). In this configuration, the aircraft is tracked with respect to the earth using a large/expensive/heavy inertial navigation system (INS)/GPS navigation system, and the helmet is then tracked with respect to the aircraft using an optical helmet tracking system. Consequently, the helmet position and orientation, and therefore the user's viewpoint, with respect to the world may be determined with substantially the same precision with which the aircraft itself may be tracked.

There are at least two disadvantages to the static tracking infrastructures, the pilot helmet variation and similar tracking systems. First, the large structure must be prepared for tracking (cameras, markers, sensors, etc. must be arranged in the room (or cockpit) and the location of these sensors must be surveyed with respect to the large structure itself), and second, the extent of tracking of the small object is limited to the size of the internal tracking area or space or the room. In addition, even in the case of the pilot helmet tracking system, the tracking precision of the aircraft itself may be on the order of meters for position and 0.1 degree for orientation, either one of which may be inadequate for certain applications.

Embodiments of the instant invention address these problems by providing a large structure equipped with a tracking system for the object to be mobile, and allowing the user to be tracked to operate not only within the confines of the large structure, but also beyond the confines of the large mobile structure. For example, instead of being a room, the large structure may be a vehicle or a mobile rig. By moving this large structure within the vicinity of any arbitrary location where the small object is desirably precisely tracked, the small object can be tracked at this general location precisely with respect to the large structure. And, to precisely track the large structure, the large structure is itself preferably equipped with a long-range (i.e., world-wide) tracking system that only the large structure can practicably accommodate (large/heavy INS, GPS orientation system with large baseline, inclinometers, etc.). By combining the tracking of a small object with respect to the large structure with tracking of the large structure with respect to the environment (which latter tracking is relatively precise), precise and long range tracking of the small object can be achieved.

Reference is now made to the several drawings. FIG. 1 and reference numeral 100 depict the relationship among several elements and coordinate systems in accordance with an embodiment of the invention. As shown, a large mobile unit 110, such as a truck, is tracked in world coordinates W 101. In one implementation, multiple GPS antennae 112a, 112b, 112c, 112d, are arranged or arrayed on the roof of truck 110 along a long baseline. As such, and as is well-known, the phase difference of received GPS signals can be used to precisely calculate the position and orientation of truck 110.

A user 122 wearing, e.g., a head-mounted display 115 (which may also include a camera), is free to move about an environment without, necessarily, being confined within the truck 110. As the user 122 moves about, his head may move to scan the scene from side to side or up and down. In the case shown in FIG. 1, a substance 130 (e.g., a buried cable or pipe, or invisible chemical) is viewed by the user 122 in the real world view and it may be desirable to identify with precision the location of substance 130, which substance itself may have its own orientation S 135. By combining the tracking information of the truck 110 with the tracking information of user 122 (e.g., coordinates H 117), it is possible to, e.g., generate appropriate imagery (e.g., graphical representation 132) for user 122, even when substance 130 is relatively small, and the user is not himself carrying tracking equipment sufficient to provide precise world coordinate tracking data.

Those skilled in the art will appreciate that, because the user can be precisely tracked, smaller objects such as overhead wires, mines, and the like, can also be more easily located with respect to the real world view.

To track user 122, truck 110 preferably includes a precision optical tracker (FIG. 2, element 242) that can detect the position and orientation of the user's head-mounted display 115. Such optical trackers are well-known. A system in accordance with the present invention may also include a movable camera that is configured to follow the user 122 or head mounted display 115. Other tracking systems that may be employed to track the user 122 include mechanical tracking systems, magnetic tracking systems, and ultrasonic tracking systems. Such systems may augment the capabilities of an optical tracker, or may be used instead of an optical tracker.

The mathematical transformations necessary to track the user 122 and head mounted display 115 with respect to, e.g., truck 110, are well known to those skilled in the art. That is, the transformations among the several possible coordinate systems including W (for world coordinates), T (for truck 110), H (for head mounted display 115) and S (for substance 130) may be performed using well-known matrix multiplications and other techniques.

Embodiments of the instant invention are also particularly useful in a case where there is an inability to rely on a tracking system that may be carried by the user 122. For example, imagine a user being tracked by GPS. If such a user needs to enter an open-sided building, the roof of the building will block the GPS signals from being received while the user is under the roof. By using a large structure in an occlusion-free area to obtain the GPS position, and then tracking the user with respect to this large structure, the user can now be tracked inside the building even if the GPS signal is not available in that particular occluded location.

The following is an exemplary use of embodiments of the instant invention. Consider a system having a mobile user on foot where 0.1 m diameter electric cables and gas lines run underground. An Augmented Reality system may provide imagery of a virtual representation of these lines on the environment. To achieve the necessary accuracy (here 0.1 m) to align the virtual cables and gas lines on the real world view, the user might need 0.05 m position and 0.1 degree orientation tracking accuracy. This degree of tracking precision is not practically possible with a tracking system mounted to the user's head, especially when using only relatively small/light sensors and without preparing the environment with a tracking infrastructure. It is, however, possible to track a vehicle (i.e., a large mobile unit) with such tracking accuracy since larger sensors/antennas can be mounted on the vehicle. Then, in accordance with embodiments of the invention, the user can be tracked with respect to the vehicle using, for example, an optical tracking system mounted to the vehicle, and thereby achieve the desired tracking precision for the user.

Embodiments of the invention are also applicable to a case of a user using a helmet tracked with respect to the cabin or interior of a land vehicle and the vehicle itself being tracked with respect to the world. As a result, the helmet can be tracked with respect to the world.

Figure 2:
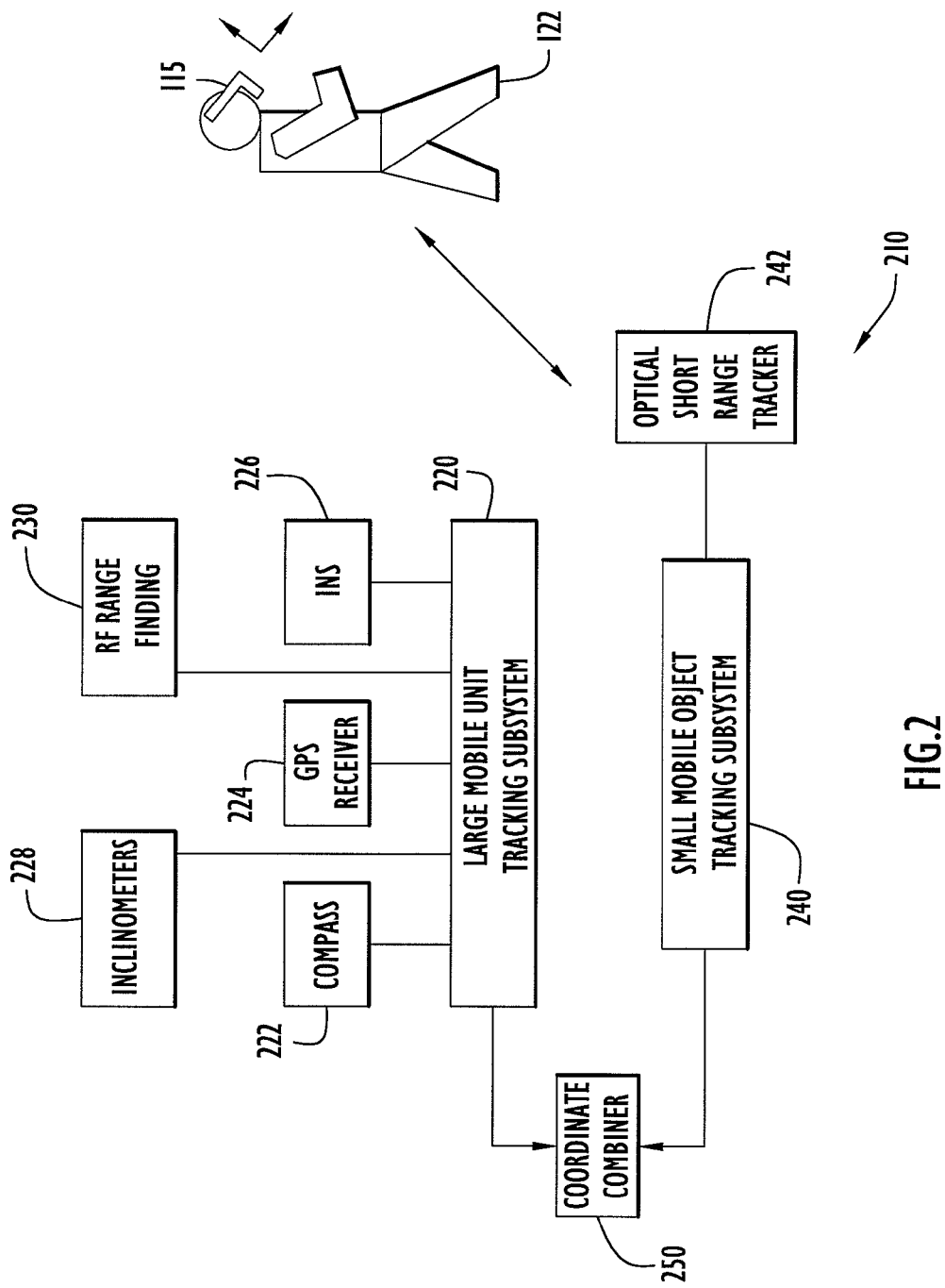
FIG. 2 is a block diagram of system elements in accordance with an embodiment of the invention.

FIG. 2 is a block diagram of system elements in accordance with an embodiment of the invention. System 210, which is preferably carried by a large mobile structure, includes a large mobile unit tracking subsystem 220 that is responsible for tracking the position and orientation of the large mobile unit with respect to a world coordinate system. Elements for accomplishing this may include, for example, a compass 222, GPS components 224 including associated antennae, INS 226, inclinometers 228, and radio frequency RF range finding equipment, among other possible position determining systems.

Also preferably mounted to the larger mobile unit, is a small mobile object tracking system 240 that includes, for example, an optical short range tracker 242 and that is configured to track the camera/head mounted display 115 of user 122. Other possible tracking devices for the small mobile object include magnetic trackers, ultrasonic trackers, and laser trackers, among others.

A coordinate combiner 250 is in communication with both the large mobile unit tracking subsystem 220 and the small mobile object tracking subsystem 240, and is preferably operable to perform the necessary coordinate translations to transform position and orientation information obtained from the small mobile object tracking subsystem into world coordinates. That is, the coordinate combiner 250 preferably combines the world coordinate position of the large mobile unit with the tracked position and orientation data of the user 122 or camera/head mounted display 115 that is has been determined with respect to the large mobile unit.

Figure 3:
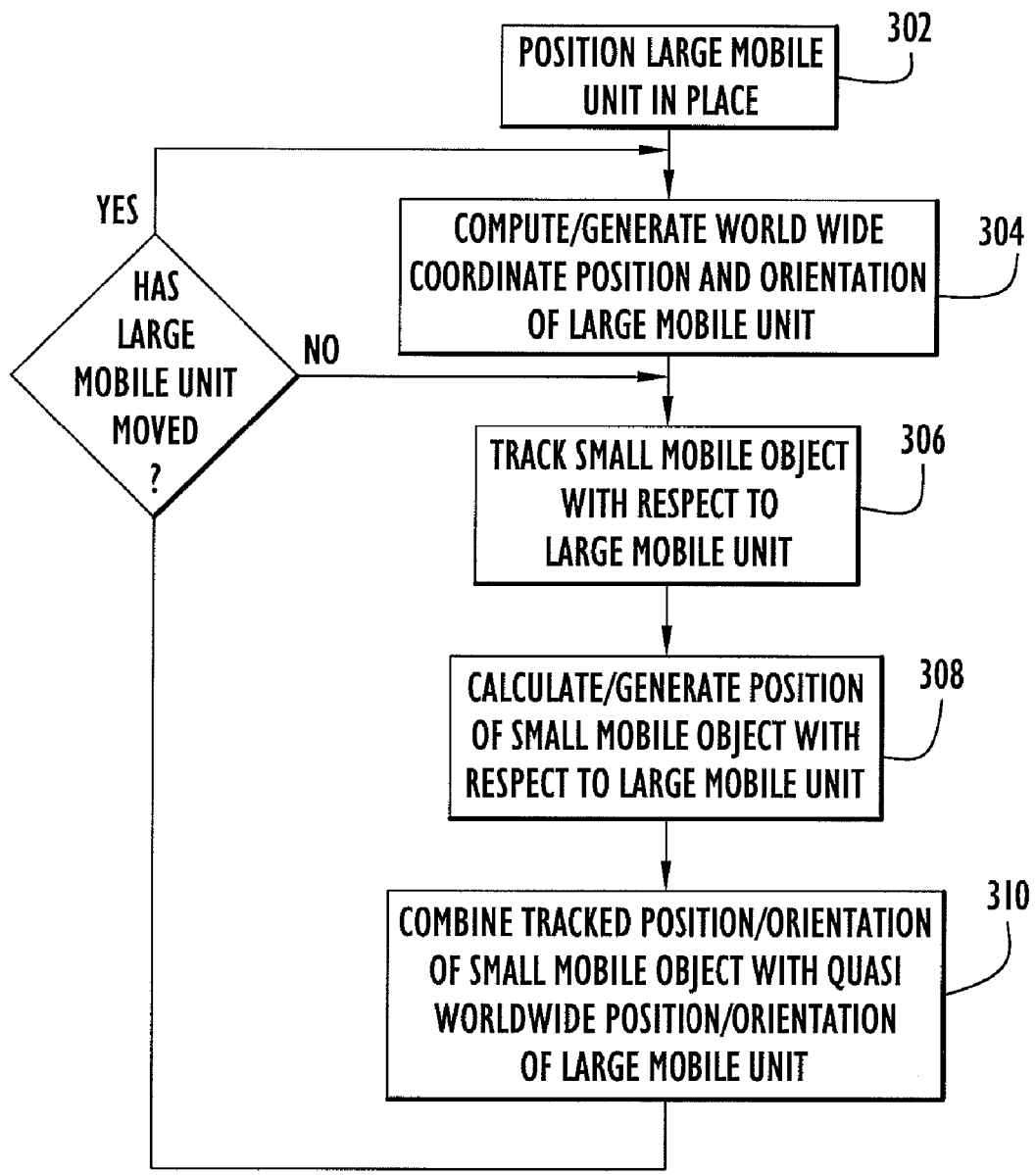
FIG. 3 shows an exemplary series of steps for performing a tracking method in accordance with an embodiment of the invention.

FIG. 3 shows an exemplary series of steps for performing a tracking method in accordance with an embodiment of the present invention. As shown, the process begins at step 302 at which a large mobile unit (e.g., a truck, mobile rig, etc.) is positioned in a given place. Then, at step 304, the position and orientation of the large mobile unit are tracked in world wide coordinates. Thereafter, at step 306, as a user roams in the vicinity of the large mobile unit, the user or associated small mobile object is tracked with respect to the large mobile unit.

Then, at step 308, the position and orientation of the small mobile object is determined with respect to the large mobile unit. At step 310, the tracked position/orientation of the small mobile object is combined with the world wide position/orientation of the large mobile unit. Because the process is preferably continuous, it is determined at step 312 whether the large mobile unit has moved position or changed orientation. If not, then the process continues again at step 306. Otherwise, the process loops to step 304 to obtain the world wide position orientation of the large mobile unit, and the process thereafter continues as shown.

Embodiments of the present invention, as described herein, are suitable for, among others, applications where (i) a small object needs to be tracked precisely with respect to the world and a large structure can be placed in the vicinity of the small object, (ii) a small object needs to be tracked but whose location precludes or limits suitable tracking, or (iii) sufficiently precise tracking technology is not available for a smaller object, but such tracking precision is available for a large structure.

What is claimed is:

1. A tracking method comprising:
    establishing a position and orientation of a first mobile unit with respect to a world coordinate system, the first mobile unit being equipped with a first tracking system that is operable to produce tracking information in the world coordinate system;
    tracking a position of a second mobile unit with respect to the first mobile unit using a second tracking system that is mounted on the first mobile unit and producing tracking information in a coordinate system relative to the first mobile unit, the second mobile unit being outside of any structural confines of the first mobile unit; and
    combining the tracking information of the first mobile unit in the world coordinate system with the tracking information of the second mobile unit in the coordinate system relative to the first mobile unit to generate a position and orientation of the second mobile unit in the world coordinate system.

2. The method of claim 1, wherein the first mobile unit is a wheeled vehicle.

3. The method of claim 1, wherein the first mobile unit is a mobile rig.

4. The method of claim 1, wherein the first mobile unit is a water borne vessel.

5. The method of claim 1, wherein the second mobile unit comprises a head-mounted display.

6. The method of claim 5, further comprising updating images on the head-mounted display based on the position of the second mobile unit with respect to the world coordinate system.

7. The method of claim 1, wherein the step of establishing a position of the first mobile unit comprises receiving GPS signals.

8. The method of claim 1, wherein the second mobile unit comprises a camera.

9. The method of claim 1, wherein the step of tracking the position of the second mobile unit comprises pointing an optical short range tracker towards the second mobile unit.

10. The method of claim 1, wherein the position and orientation of the second mobile unit in the world coordinate system have a precision of, respectively, less than 0.1 meter and less than 1 degree.

11. The method of claim 1, further comprising using the position and orientation of the second mobile unit in the world coordinate system to generate computer-generated imagery for an augmented reality system.

12. The method of claim 1, wherein the second mobile unit does not itself generate tracking information.

13. A tracking method for use in an augmented reality system, the method comprising:
    tracking a first mobile unit with respect to a world coordinate system, the first mobile unit being equipped with a first tracking system that is operable to produce tracking information in the world coordinate system;
    tracking a second mobile unit with a tracking system mounted on the first mobile unit, the tracking of the second mobile unit being with respect to a position and orientation of the first mobile unit to produce tracking information of the second mobile unit, the second mobile unit being outside of any structural confines of the first mobile unit;
    combining the tracking information of the first mobile unit in the world coordinate system with the tracking information of the second mobile unit, and thereby generate a position and orientation of the second mobile unit in the world coordinate system; and
    displaying on a head-mounted display computer generated imagery that is associated with a real world scene and that is consistent with the position and orientation of the second mobile unit in the world coordinate system.

14. The method of claim 13, wherein the first mobile unit is a land vehicle.

15. The method of claim 13, wherein the first mobile unit is a water-borne vehicle.

16. The method of claim 13, wherein the second mobile unit comprises the head-mounted display.

17. The method of claim 13, wherein the step of tracking a first mobile unit comprises receiving GPS signals.

18. The method of claim 13, wherein the second mobile unit comprises a camera.

19. The method of claim 13, wherein the tracking system mounted on the first mobile unit comprises an optical short range tracker.

20. The method of claim 13, wherein the position and orientation of the second mobile unit in the world coordinate system have a precision of, respectively, less than 0.1 meter and less than 1 degree.

21. The method of claim 13, further comprising using the position and orientation of the second mobile unit in the world coordinate system to generate computer-generated imagery for an augmented reality system.

22. The method of claim 13, wherein the second mobile unit does not itself generate tracking information.

23. A system for tracking, comprising:
    a first mobile unit comprising a first tracking system that is operable to produce tracking information for the first mobile unit in a world coordinate system, the first mobile unit further comprising a second tracking system that is operable to track an object with respect to the first mobile unit;
    a second mobile unit configured to be tracked by the second tracking system at least when the second mobile unit is outside of any structural confines of the first mobile unit, the second tracking system configured to produce tracking information for the second mobile unit with respect to the first mobile unit; and a coordinate combiner that receives (i) the tracking information for the first mobile unit in the world coordinate system and (ii) the tracking information for the second mobile unit with respect to the first mobile unit, and produces tracking information for the second mobile unit in the world coordinate system.

24. The system of claim 23, wherein the first mobile unit is a land-based vehicle.

25. The system of claim 23, wherein the first tracking system comprises a GPS receiver.

26. The system of claim 23, wherein the first tracking system comprises a plurality of GPS antennas arranged along a baseline.

27. The system of claim 23, wherein the second tracking system comprises an optical short range tracker.

28. The system of claim 23, wherein the second tracking system comprises at least one of an ultrasonic, a magnetic or a mechanical tracker.

29. The system of claim 23, wherein the second mobile unit comprises a part of an Augmented Reality system.

30. The system of claim 29, wherein the second mobile unit comprises a head-mounted display.

31. The system of claim 30, wherein the Augmented Reality system is configured to display on the head-mounted display computer generated imagery that is associated with a real world scene that is in a line of sight of a user and that is consistent with the tracking information of the second mobile unit in the world coordinate system.

32. The system of claim 23, wherein the second mobile unit does not itself generate tracking information.

* * * * *